United States Patent Office 3,642,987
Patented Feb. 15, 1972

3,642,987
LINCOMYCIN AND TETRACYCLINE COMPOSITIONS
Malcolm E. Bergy, 2617 Lomond Drive, and Ross R. Herr, 1303 Roseland Ave., both of Kalamazoo, Mich. 49001, and Donald Joseph Mason, 4802 Romence Road, Portage, Mich. 49002
No Drawing. Continuation of application Ser. No. 723,322, Apr. 22, 1968, which is a continuation-in-part of application Ser. No. 134,843, Aug. 30, 1961, now Patent No. 3,155,580. This application Dec. 23, 1969, Ser. No. 884,769
Int. Cl. A61k *21/00*
U.S. Cl. 424—181         3 Claims

ABSTRACT OF THE DISCLOSURE

Lincomycin and tetracycline composition with ranges of lincomycin 5–95 parts (50–1000 mg.) to tetracycline 95–5 parts (50–1000 mg.). The combination of antibiotics is prepared with pharmaceutical carriers for oral and parenteral administration and prevents developments of resistance pathogens and has synergistic activity.

---

This application is a continuation of application Ser. No. 723,322, and now abandoned, which is a continuation-in-part of application Ser. No. 134,843, filed Aug. 30, 1961 now U.S. Pat. No. 3,155,580.

This invention relates to therapeutic compositions containing a combination of antibiotics and, more particularly, to compositions comprising lincomycin and tetracycline.

The broad spectrum antibiotic activity of tetracycline in both human and veterinary medicine is well documented in the literature. Similarly, the effectiveness of lincomycin against various pathogenic organisms has likewise become well recognized in both human and veterinary medicine. It has been unexpectedly discovered that lincomycin is not only capable of complementing and enhancing the antibiotic activity of tetracycline but that a pronounced synergism is exhibited by combinations of the two antibiotics against certain organisms only moderately susceptible to their individual actions. Moreover, combinations of lincomycin have been shown to slow the development of resistance by certain pathogens.

It is therefore an object of the present invention to provide a combination of lincomycin and tetracycline for more effective therapy of susceptible conditions than is possible with tetracycline acting alone. It is a further object of this invention to offer a composition comprising lincomycin and tetracycline in synergistic combination for the advantageous treatment of certain bacterial infections. Another object is the provision of a composition containing lincomycin and tetracyline in combination with at least one addtional active therapeutic ingredient which supplements and extends the usefulness of the basic combination.

The foregoing and additional objects have been accomplished by the provision of a composition comprising a mixture of lincomycin and tetracycline.

The term "lincomycin" as used shall be taken to mean lincomycin free base and the pharmacologically acceptable acid addition salts thereof. The free base and salts thereof can be prepared as described in U.S. Pat. 3,086,912.

The term "tetracycline" as used in the specification and claims herein shall be taken to include the free bases and the pharmaceutically and physiologically acceptable organic and inorganic salts, as well as chelates, esters and complexes, of tetracycline, oxytetracycline, demethylchloretetracycline and chlortetracycline, in particular the acid salts such as the alkali metal acetates or phosphates; the latter include specifically the alkali metal hexametaphosphates, metaphosphates, tripolyphosphates, tetrametaphosphates, trimetaphosphates, polymetaphosphates, especially the sodium hexametaphosphates and potassium metaphosphates of tetracycline, oxytetracycline, demethylchlortetracycline and chlortetracycline (also denominated as "complexes" of the free antibiotic bases); the neutral metal salts; including alkali metal and alkaline earth metal salts of tetracycline, oxytetracycline, demethylchlortetracycline and chlortetracycline such as the sodium, potassium, calcium and magnesium salts, the amine salts such as the procaine salts, the aminomethyl derivatives such as pyrrolidinomethyl, the acid addition salts such as the hydrochlorides, and the various complexes of tetracycline, oxytetracycline, demethylchlortetracycline and chlortetracycline. For mixtures of tetracyclines with phosphates, either sodium hexametaphosphate or potassium metaphosphate may be used in dry or fluid formulations. The tetracycline hexametaphosphate "complex" is used in dry formulations but is not recommended for fluid preparations.

Lincomycin and tetracycline employed together afford a combination by which the control of more organisms can be obtained than is possible with either antibiotic alone, thus broadening or lengthening the antibacterial spectrum. Against organisms which are susceptible to both antibiotics administered singly, there is a reinforcement resulting in many instances in quicker and more thorough response. Also of great importance is the synergism of the combination against pathogens which in the past have presented clinical difficulties. An example of the prominent synergistic activity of the lincomycin-tetracycline combination is seen in the efficacy of the said combination aginst *Staphylococcus aureus*.

The combination of lincomycin and tetracycline can be employed with a high degree of efficacy in the treatment of a large variety of infections known to be susceptible to the individual antibiotics, in which conditions a lower dosage often can be prescribed to give the desired clinical results in a shorter time than would be the case where the antibiotics are administered singly. As a consequence, where side reactions have been observed with the individual antibiotics, it is frequently possible to administer combinations of the two antibiotics in lesser amounts which are nevetheless effective but which do not give rise to untoward reactions. Additionally, the cost to the patient is often diminished where the course of the infection is terminated earlier than otherwise would be the case.

The development of bacterial resistance to tetracycline has been reported as occurring with a number of organisms, thereby limiting its applicability in many instances where it is most needed. The decrease in the development of bacterial resistance to tetracycline with lincomycin-tetracycline combinations therefore enhances the usefulness of tetracycline and, concomitantly, offers in addition the reinforcing and sometimes synergistic effect resulting from the combination.

The combination of lincomycin and tetracycline (and their derivatives) is useful in combating many bacterial infections in man and animals. For these uses, the antibiotic compounds are dispersed in a pharmaceutically acceptable carrier which may be either a solid material, powder, or a liquid. The compositions can take the form of tablets, effervescent tablets, powders, wafers, cachets, granules, pills, capsules (both hard and soft gelatin), dispersions in edible oils, aqueous dispersions or other dosage forms which are particularly useful for oral administration. Liquid diluents are employed in sterile conditions for parenteral use. The liquid media can be a sterile solvent or a sterile suspending vehicle containing, for example, injectable oils or water. Aqueous vehicles can contain hydrophilic colloids such as sodium carboxymethylcellulose, methylcellulose, polyvinyl pyrrolidone, gelatin, tragacanth, and the like. The antibiotic compounds can be admixed with solid diluents and/or tableting adjuvants such as corn starch, lactose, talc, stearic acid, magnesium stearate, gums, and the like. Any of the capsulating or tableting materials used in pharmaceutical practice can be employed where there is no incompatibility with the antibiotics, and the materials can be tableted with or without adjuvants. Alternatively, the antibiotics can be enclosed in the usual capsule or resorbable material such as the conventional gelatin capsule and administered in that form. In yet another embodiment, the antibiotics can be put up in powder packets and so employed. Or, the antibiotic combination can be compounded in the form of a palatable suspension in a suitable fixed oil containing, for example, about 2% aluminum monostearate as a suspending agent. Such a suspension can be given orally or can be capsulated. The antibiotics in the form of ointments, including a petrolatum-type grease base, creams, water-oil emulsions and lotions are useful topically; other topical formulations include nosedrops, sprays, troches, and suppositories. For veterinary use, the combination is useful in the form of bougies, mastitis ointments, oil dispersions, and the like.

The term "unit dosage form" as used in the specification and claims refers to physically discrete units suitable as unitary dosages, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use, as disclosed in detail in this specification, these being features of the present invention. Examples of suitable oral unit dosage forms in accord with this invention are tablets, capsules, pills, powder packets, wafers, cachets, teaspoonfuls, tablespoonfuls, droperfuls, segregated multiples of any of the foregoing, and other forms as hereinafter described.

As noted hereinbefore, use of the lincomycin-tetracycline combinations of the present invention presents the advantage in a number of clinical conditions of requiring a smaller amount of each antibiotic than would normally be employed were the antibiotics administered singly. The dosage of the antibiotic combination must, of course, be determined in accord with the patient's age, weight and condition, as well as with regard for the particular infection or type of infection being treated. For convenient and effective administration of the antibiotic combination of this invention, lincomycin can be present in the selected dosage form in amounts ranging from about 50 to about 1000 mg., and tetracycline in amounts ranging from about 50 to about 1000 mg. per unit dose. Preferably, a dosage form containing in each unit from about 100 to about 500 mg. of lincomycin and from about 100 to about 500 mg. of tetracycline is employed. Capsules or tablets containing 250 mg. of lincomycin and 250 mg. of tetracycline, for example, given on a schedule of 1 or 2 capsules or tablets 3 or 4 times daily are effective in susceptible conditions. In general, the unexpected synergistic antibacterial activity of this combination is observed on a regimen comprising dosage units containing from about 5 to about 95 parts by weight of lincomycin together with from about 95 to about 5 parts by weight of tetracycline.

The following examples are illustrative of the best mode contemplated by the inventors for carrying out their invention and are not to be construed as limiting.

EXAMPLE 1

Capsules

One thousand two-piece hard gelatin capsules for oral use, each containing 250 mg. of lincomycin hydrochloride and 150 mg. of tetracycline hydrochloride are prepared from the following types and amounts of materials:

| | Gm. |
|---|---|
| Lincomycin hydrochloride | 250 |
| Tetracycline hydrochloride | 150 |
| Corn starch | 150 |
| Talc | 75 |
| Magnesium stearate | 25 |

The materials are thoroughly mixed and then encapsulated in the usual manner.

The foregoing capsules are useful for the systemic treatment of infection in adult humans by the oral administration of 1 capsule every 4 hours.

Using the procedure above, capsules are similarly prepared containing tetracycline hydrochloride in 50, 100 and 250 mg. amounts by substituting 50, 100 and 250 gm. of tetracycline hydrochloride for the 150 gm. used above.

EXAMPLE 2

Capsules

One thousand two-piece hard gelatin capsules for oral use, each containing 300 mg. of lincomycin hydrochloride and 150 mg. of tetracycline hydrochloride, are prepared from the following types and amounts of ingredients:

| | Gm. |
|---|---|
| Lincomycin hydrochloride | 300 |
| Tetracycline hydrochloride | 150 |
| Talc | 75 |
| Magnesium stearate | 25 |

The ingredients are thoroughly mixed and then encapsulated in the usual manner.

The foregoing capsules are useful for the systemic treatment of infection in adult humans by the oral administration of 1 capsule every 6 hours.

EXAMPLE 3

Tablets

One thousand tablets for oral use, each containing 300 mg. of lincomycin hydrochloride and 200 mg. of tetracycline hydrochloride are prepared from the following types and amounts of materials:

| | Gm. |
|---|---|
| Lincomycin hydrochloride | 300 |
| Tetracycline hydrochloride | 200 |
| Lactose | 125 |
| Corn starch | 65 |
| Magnesium stearate | 25 |
| Light liquid petrolatum | 3 |

The ingredients are thoroughly mixed and slugged. The slugs are broken down by forcing through a number sixteen screen. The resulting granules are then compressed into tablets, each tablet containing 300 mg. of lincomycin hydrochloride and 200 mg. of tetracycline hydrochloride.

The foregoing tablets are useful for systemic treatment of infections in adult humans by oral administration of 1 tablet every 4 hours.

Using the above procedure, tablets are similarly prepared containing tetracycline hydrochloride in 100 and 300 mg. amounts by substituting 100 and 300 mg. of tetracycline hydrochloride for the 200 gm. used above.

EXAMPLE 4

Granules 2367 gm. of a granulation suitable for reconstitution with water prior to use is prepared from the following types and amounts of ingredients:

| | Gm. |
|---|---|
| Lincomycin hydrochloride | 150 |
| Tetracycline hydrochloride | 150 |
| Lecithin | 5 |
| Sucrose, powdered | 2000 |
| Flavor | 60 |
| Sodium metabisulfite | 2 |

The tetracycline is finely divided and coated with the lecithin. The coated tetracycline, lincomycin, sugar, flavor, and sodium metabisulfite are mixed together until thoroughly blended. The powder mixture is wetted with water and forced through a screen to form granules. The granules are dried and 23.67 gm. filled into 60 cc. bottles. Prior to use sufficient water is added to the granules to make 60 cc. of composition.

The foregoing compositin is useful for systemic treatment of infection, particularly in children at a dose of one teaspoonful 4 times daily.

EXAMPLE 5

Capsules

Ten thousand two-piece hard gelatin capsules for oral use, each containing 125 mg. of lincomycin and 200 mg. of tetracycline, are prepared from the following types and amounts of materials:

| | Gm. |
|---|---|
| Lincomycin hydrochloride | 1250 |
| Tetracycline hydrochloride | 2000 |
| Corn starch, U.S.P. | 750 |
| White mineral oil, U.S.P. | 100 |
| Magnesium stearate, powder | 50 |
| Talc, U.S.P. | 100 |

The finely powdered ingredients are thoroughly mixed and capsulated in the usual manner.

EXAMPLE 6

Capsules

Ten thousand two-piece hard gelatin capsules for oral use, each containing 125 mg. of lincomycin hydrochloride and 250 mg. of tetracycline, are prepared from the following types and amounts of materials:

| | Gm. |
|---|---|
| Lincomycin hydrochloride | 1250 |
| Tetracycline phosphate complex | 2500 |
| Magnesium stearate, powder | 100 |
| White mineral oil, U.S.P. | 20 |
| Starch, bolted, dried | Q.s. |

The finely ground ingredients are thoroughly mixed, slugged, screened and capsulated in the usual manner.

EXAMPLE 7

Capsules

Ten thousand two-piece hard gelatin capsules for oral use, each containing 60 mg. of lincomycin and 60 mg. of tetracycline, are prepared from the following types and amounts of materials:

| | Gm. |
|---|---|
| Lincomycin hydrochloride | 600 |
| Tetracycline phosphate complex | 600 |
| Magnesium stearate, powder | 25 |
| White mineral oil, U.S.P. | 5 |
| Starch, bolted, dried | Q.s. |

The finely ground ingredients are thoroughly mixed, slugged, screened and capsulated in the usual manner. This formulation is useful for systemic treatment of infection, particularly in dogs and cats at a dose of 1 or 2 capsules 3 times daily.

EXAMPLE 8

Tablets

Ten thousand oral tablets, each containing 125 mg. of lincomycin and 125 mg. of tetracycline, are prepared from the following types and amounts of materials:

| | Gm. |
|---|---|
| Lincomycin hydrochloride | 1250 |
| Tetracycline phosphate complex | 1250 |
| Lactose, U.S.P. | 450 |
| Corn starch, U.S.P. | 450 |
| Calcium stearate, powder | 5 |
| White mineral oil, U.S.P. | 100 |

The materials are thoroughly mixed and slugged. The slugs are broken down by forcing through a No. 16 screen. The resulting granules are then compressed into tablets in the usual manner.

EXAMPLE 9

Aqueous suspension

An aqueous suspension for oral use containing in each 5 ml. 75 mg. of lincomycin and 75 mg. of tetracycline is prepared from the following types and amounts of materials:

| | Gm. |
|---|---|
| Lincomycin hydrochloride | 15.0 |
| Tetracycline, powdered | 15.0 |
| Methylparaben, U.S.P. (methyl ester of p-hydroxybenzoic acid) | 0.75 |
| Propylparaben, U.S.P. (propyl ester of p-hydroxybenzoic acid) | 0.25 |
| Sodium chloride, U.S.P. | 3.5 |
| Sucrose, U.S.P. | 650.0 |
| Tragacanth, powdered, U.S.P. | 2.0 |
| Tween 85 (polyoxyalkylene ether of partial oleic acid ester) | 0.3 |
| Sodium metabisulfite | 1.0 |
| Oil of orange | 1.0 |
| Deionized water, q.s., 1000.0 ml. | |

The sugar and tragacanth are thoroughly mixed and dispersed in water with stirring. The parabens, sodium chloride, Tween 85, sodium metabisulfite and the antibiotics are added, stirring being continued. The flavor is then introduced and the resulting preparation passed through a colloid mill to assure a uniform dispersion.

EXAMPLE 10

Sterile aqueous suspension

A sterile aqueous suspension of lincomycin and tetracycline is prepared from the following types and amounts of materials:

| | Mg. |
|---|---|
| Lincomycin hydrochloride | 100 |
| Tetracycline, micronized | 100 |
| Polyethylene glycol 4000 | 30 |
| Polysorbate 80, U.S.P. (polyoxyethylene-[20]-sorbitan monooleate) | 4 |
| Propylparaben | 0.42 |
| Water for injection, U.S.P., q.s. 1 ml. | |

The sterile antibiotics are dispersed in the sterile vehicle, giving a final product having a pH between 6.3 and 6.8. Each milliliter of the finished preparation contains 100 mg. each of lincomycin and tetracycline and is suitable for topical (including aural and ophthalmic) and parenteral use.

EXAMPLE 11

Ointment

Twenty kilograms of an ointment is prepared from the following types and amounts of materials:

| | Gm. |
|---|---|
| 2.5% lincomycin hydrochloride | 500 |
| 2.5% tetracycline hydrochloride | 500 |
| 25% white mineral oil, U.S.P. | 5000 |
| 20% wool fat, U.S.P. | 4000 |
| white petrolatum Qs | 20,000 |

The antibiotics are mixed with the mineral oil and the resulting slurry is milled. The remaining ingredients are melted, strained and adjusted to 50 to 55° C. and then added to the slurry, thoroughly and continuously mixing until the temperature of the mixture has dropped to about 32° C. The resulting preparation is suitable for topical use, including use as an ophthalmic ointment.

EXAMPLE 12

Following the procedure of each of the preceding Examples 1 through 11, inclusive, one each of lincomycin sulfate, lincomycin nitrate, lincomycin phosphate, lincomycin citrate, lincomycin lactate, lincomycin acetate, lincomycin tartrate, and lincomycin succinate, is substituted in an equivalent amount for the lincomycin hydrochloride shown in the example to provide similar therapeutic properties.

We claim:

1. A therapeutic composition which comprises: from about 5 to about 95 parts by weight of lincomycin and about 95 to about 5 parts by weight of tetracycline, dispersed in a pharmaceutical carrier.

2. The composition of claim 1 in unit dosage form where the concentration of lincomycin is from about 50 to about 1000 mg. per dosage unit and the concentration of tetracycline is from about 50 to about 1000 mg. per dosage unit.

3. The composition of claim 1 in oral unit dosage form wherein the concentration of lincomycin is about 250 mg. per dosage unit and the concentration of tetracycline is about 250 mg. per dosage unit.

References Cited

UNITED STATES PATENTS

| | | | |
|---|---|---|---|
| 2,544,630 | 3/1951 | Hegarty et al. | 424—227 |
| 2,699,054 | 1/1955 | Conover | 424—227 |
| 2,813,820 | 11/1957 | English et al. | 424—227 |
| 2,822,314 | 2/1958 | Ferlauto et al. | 424—227 |
| 3,086,912 | 4/1963 | Bergy et al. | 424—227 |

JEROME D. GOLDBERG, Primary Examiner

D. M. STEPHENS, Assistant Examiner

U.S. Cl. X.R.

424—227